United States Patent
Fujino

[11] Patent Number: 5,614,783
[45] Date of Patent: Mar. 25, 1997

[54] FLUORESCENT LAMP INCLUDING FIRED NON-LUMINESCENT MATERIAL

[75] Inventor: Shigeo Fujino, Odawara, Japan

[73] Assignee: Kasei Optonix, Ltd., Tokyo, Japan

[21] Appl. No.: 381,061

[22] Filed: Jan. 31, 1995

Related U.S. Application Data

[62] Division of Ser. No. 925,667, Aug. 7, 1992, Pat. No. 5,438,234.

[30] Foreign Application Priority Data

Aug. 13, 1991 [JP] Japan .................................. 3-202765

[51] Int. Cl.⁶ .................................................. H01J 1/62
[52] U.S. Cl. ................................. 313/485; 427/67
[58] Field of Search ................................. 313/485, 486, 313/487; 427/67

[56] References Cited

U.S. PATENT DOCUMENTS

| | | | |
|---|---|---|---|
| 4,069,441 | 1/1978 | Wanmaker et al. | 313/487 |
| 4,396,863 | 8/1983 | Ranby et al. | 313/486 |
| 4,952,422 | 8/1990 | Pappalardo et al. | 427/67 |
| 5,126,166 | 1/1992 | Dutta et al. | 427/67 |

FOREIGN PATENT DOCUMENTS

| | | | |
|---|---|---|---|
| 02228010 | 12/1985 | European Pat. Off. | C09K 11/78 |
| 60117558 | 8/1985 | Japan | H01J 61/44 |
| 02040854 | 2/1990 | Japan | H01J 61/46 |

OTHER PUBLICATIONS

Data Sheet on High Pority Alumina by Malakoff Industries Inc., P.O. Box 27002, Richmond Va 23261.

*Primary Examiner*—Michael Horabik
*Assistant Examiner*—Michael Day
*Attorney, Agent, or Firm*—Oblon, Spivak, McClelland, Maier & Neustadt, P.C.

[57] ABSTRACT

A fluorescent lamp includes either laminated layers including a non-fluorescent substance layer, and a phosphor layer, or a layer including a mixture of the non-fluorescent substance, and a phosphor, wherein the non-fluorescent substance is a rare earth oxide of either yttrium, gadolinium, or lanthanum. The rare earth oxide is fired to at least 1000° C. thereby providing the lamp with a higher luminous flux maintaining ratio.

13 Claims, 1 Drawing Sheet

FLUORESCENT LAMP INCLUDING FIRED NON-LUMINESCENT MATERIAL

This is a Division, of application Ser. No. 07/925,667 filed on Aug. 7, 1992, now U.S. Pat. No. 5,438,234.

The present invention relates to a fluorescent lamp having the optical output controlled.

Japanese Unexamined Utility Model Publication No. 117585/1985 discloses a cold cathode fluorescent lamp having the optical output of a fluorescent lamp controlled without changing the emission wavelength by coating on the inner wall of a glass bulb, a phosphor containing a non-fluorescent substance, for example, a manganese-activated zinc orthosilicate phosphor powder or a cerium-terbium-activated lanthanum silicophosphate phosphor powder and a calcium pyrophosphate powder or an aluminum powder.

Further, U.S. Pat. No. 4,069,441 discloses a gas discharge lamp having at least two layers of phosphor particles laminated on the surface of a support, whereby a high level of optical output has been made possible by converting the radiant energy generated by gas discharge to a radiation with a long wavelength, by incorporating a non-fluorescent white substance which absorbs no more than 20% of ultraviolet rays with a wavelength of 240 μm or longer, for example, an ultraviolet reflective white substance such as barium sulfate or calcined calcium phosphate, to the phosphor layers except for the layer on the discharge side.

Furthermore, Japanese Unexamined Patent Publication No. 40854/1990 discloses a fluorescent lamp whereby high luminance and high color rendering are attained by coating a second layer comprising one or more phosphors on a first layer comprising a non-fluorescent substance of the formula $LnPO_4$ (Ln=La, Gd, Y or Al), or by coating a mixture of such a non-fluorescent substance and phosphors.

Still further, European Patent No. 228010 discloses an inexpensive fluorescent composition with high luminance having a phosphor and an alkaline earth metal sulfate fused to each other.

The above fluorescent lamps have a drawback that as compared with fluorescent lamps having no non-fluorescent substance incorporated, a decrease with time of the optical outputs (luminous flux-maintaining ratios) is substantial.

It is an object of the present invention to overcome such a drawback and to provide a fluorescent lamp whereby the optical output can be controlled without lowering the luminous flux-maintaining ratio of the fluorescent lamp.

The present invention provides a fluorescent lamp having a non-fluorescent substance layer and a phosphor layer laminated and coated on, or having a fluorescent composition composed of a mixture of a non-fluorescent substance and a phosphor, coated on the inner wall of a glass bulb, wherein the non-fluorescent substance is an oxide containing at least one rare earth element selected from the group consisting of yttrium, gadolinium and lanthanum.

Now, the present invention will be described in further detail with reference to the preferred embodiments.

In the present invention, as the rare earth element for the above non-fluorescent substance, yttrium and gadolinium are excellent in the luminous flux-maintaining ratio, and yttrium is particularly preferred from the viewpoint of various properties including the initial luminous flux and the luminous flux-maintaining ratio.

The oxide of such rare earth element may, for example, be represented by the formula $(Y_xGd_yLa_z)_2O_3$ where $0 \leq x \leq 1$, $0 \leq y \leq 1$, $0 \leq z \leq 1$, and $x+y+z=1$.

In the present invention, it is preferred to incorporate at least one element selected from the group consisting of an alkaline earth metal and boron in addition to the above oxide of such rare earth element in order to avoid a decrease of the luminous flux-maintaining ratio. The content of such a substance is usually very small, and it is advisable to incorporate such an element in an amount of not higher than 5000 ppm, preferably from 10 to 3000 ppm. It is particularly preferred to incorporate boron in an amount of from 10 to 1000 ppm, more preferably from 50 to 500 ppm, or an alkaline earth metal in an amount of from 0 to 1500 ppm, more preferably from 10 to 1000 ppm. The alkaline earth metal is preferably selected from the group consisting of Ba, Sr, Ca and Mg, and it is particularly preferred to use Ba as an essential component.

As the above non-fluorescent material, it is particularly effective to use particles preliminarily fired at a temperature of at least 1000° C., preferably from 1100° C. to 1600° C. It is believed that by the firing, the crystallizability of the powder is improved, whereby the deterioration of the useful life can be suppressed.

Further, it is preferred to incorporate the above-mentioned at least one element selected form the group consisting of an alkaline earth metal and boron by mixing or coprecipitation prior to the firing.

Further, the particle size of the non-fluorescent substance is preferably relatively close to the particle size of the phosphor to be coated from the viewpoint of the uniformity of the coated surface. It is advisable that the average particle size of the non-fluorescent substance is smaller than the average particle size of the phosphor to be used, and it is particularly recommended that the average particle size of the non-fluorescent substance is smaller by from 1 to 3 μm than the average particle size of the phosphor to be used. The particle size is preferably within a range of from 0.5 μm to 10 μm, more preferably from 1μm to 5 μm by FSSS (Fisher Sub-Sieve Sizer).

In the present invention, in addition to the oxide containing the above-mentioned rare earth element, the non-fluorescent substance may contain a conventional ultraviolet reflective white or transparent inorganic substance (such as silica, alumina or barium sulfate).

The phosphor to be used in the present invention may be any phosphor commonly used for conventional fluorescent lamps or any phosphor which emits a light under excitation by ultraviolet rays. In the following Examples, a tri-color lamp has been described, for which a long useful life is particularly desired at present, but the present invention is by no means restricted to such specific Examples.

The present invention resides in suppressing as far as possible the change with time of the properties in the switched-on state of a fluorescent lamp having the optical output controlled, by incorporating the above-mentioned oxide of a rare earth element as a non-fluorescent substance to the phosphor. The amount of the rare earth oxide added, is determined depending upon the required optical output and is not particularly limited.

Now, the present invention will be described with reference to Examples. However, it should be understood that the present invention is by no means restricted by such specific Examples.

EXAMPLES 1 to 10

Figure 1A:
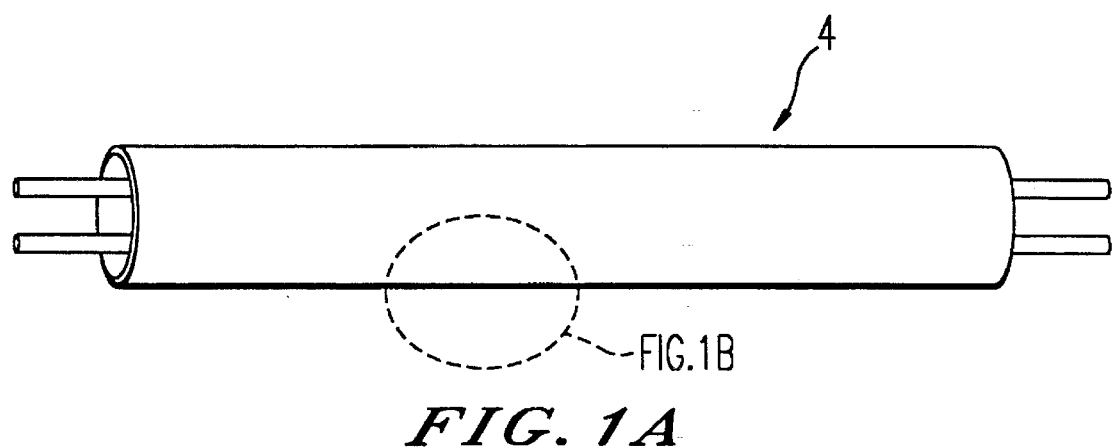
FIG. 1 shows a fluroescent lamp 4, with an enlarged cut away of a section of the tube. This enlarged section shows the glass of the glass bulb 1, the phosphor layer 2, and the non-fluorescent substance 3. This FIGURE is not to scale.
Figure 1B:
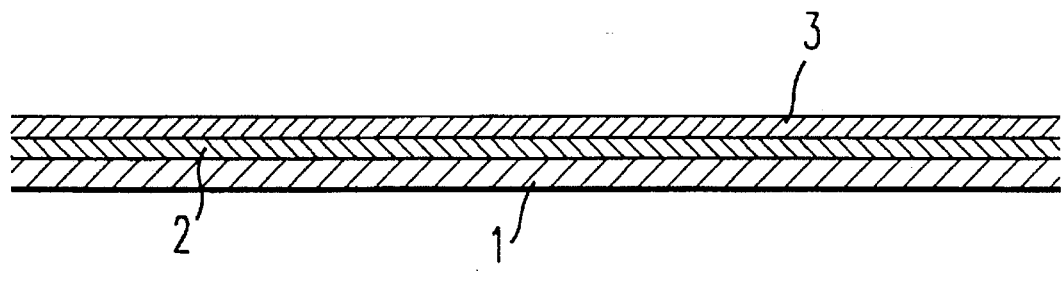

A phosphor mixture comprising 38% by weight of $Y_2O_3Eu$ (red-emitting phosphor), 28% by weight of LaPO$_4$:Ce,Tb (green-emitting phosphor) and 34% by weight of (Sr,Ca,Ba,Mg)$_{20}$(PO$_4$)$_2$Cl$_2$:Eu (blue-emitting phosphor) and, as a non-fluorescent substance, a powder obtained by firing Y$_2$O$_3$ at 1400° C. (containing 160 ppm of B, 320 ppm of Ba and 20 ppm of Sr i.e. the total amount of B, Ba and Sr being 500 ppm) were mixed in the various proportions as identified in Table 1, and fluorescent lamps FCL30EX-N (as prescribed in JIS) were prepared. With respect to each lamp, the initial luminous flux (lm) and the luminous flux-maintaining ratio upon expiration of 2000 hours were examined, and the results are shown in Table 1.

The "initial luminous flux" is the luminous flux (lm) upon expiration of 100 hours after switching on, and the "luminous flux-maintaining ratio" is the percentage of the luminous flux upon expiration of 2000 hours/the luminous flux upon expiration of 100 hours (the same will apply hereinafter). As is evident from Table 1, all the fluorescent lamps are capable of controlling the optical outputs (luminous flux) without reducing the luminous flux-maintaining ratios.

TABLE 1

| Example No. | Phosphor mixture | Y$_2$O$_3$ | Initial luminous flux (lm) | Luminous flux-maintaining ratio (%) |
| --- | --- | --- | --- | --- |
| 1  | 100 | 0  | 2080 | 88.0 |
| 2  | 90  | 10 | 2000 | 88.2 |
| 3  | 80  | 20 | 1980 | 88.2 |
| 4  | 70  | 30 | 1900 | 88.5 |
| 5  | 60  | 40 | 1795 | 88.4 |
| 6  | 50  | 50 | 1715 | 88.6 |
| 7  | 40  | 60 | 1575 | 88.6 |
| 8  | 30  | 70 | 1490 | 89.2 |
| 9  | 20  | 80 | 1270 | 89.5 |
| 10 | 10  | 90 | 950  | 91.3 |

EXAMPLE 11

A fluorescent lamp was prepared in the same manner as in Example 4 except that instead of YO$_3$ as the non-fluorescent substance, La$_2$O$_3$ (containing the same amounts of B, Ba and Sr) was used as a non-fluorescent substance, and the initial luminous flux and the luminous flux-maintaining ratio were measured. This fluorescent lamp had an initial luminous flux of 1950 lm and a luminous flux-maintaining ratio of 88.0%.

EXAMPLE 12

A fluorescent lamp was prepared in the same manner as in Example 4 except that Y$_2$O$_3$ as the non-fluorescent substance, Gd$_2$O$_3$ (containing the same amounts of B, Ba and Sr) was used as a non-fluorescent substance. This fluorescent lamp had an initial luminous flux of 1920 lm, and a luminous flux-maintaining ratio of 88.3%.

EXAMPLE 13

A fluorescent lamp was prepared in the same manner as in Example 4 except that Y$_2$O$_3$ containing no B, Ba or Sr was used. This fluorescent lamp had an initial luminous flux of 1765 lm and a luminous flux-maintaining ratio of 88.0%.

COMPARATIVE EXAMPLES 1 to 4

Fluorescent lamps were prepared in the same manner as in Examples 1 to 10 except that instead of Y$_2$O$_3$ as the non-fluorescent substance, Ca$_2$P$_2$O$_7$, alumina, BaSO$_4$ and LaPO$_4$ were, respectively, incorporated in an amount of 30%, and evaluated in the same manner. The results are shown in Table 2. As is evident from Table 2, a decrease in the luminous flux-maintaining ratio is substantial with the fluorescent lamps having such non-fluorescent substances incorporated.

TABLE 2

| Comparative Example No. | Non-fluorescent substance | Initial luminous flux (lm) | Luminous flux-maintaining ratio (%) |
| --- | --- | --- | --- |
| 1 | Ca$_2$P$_2$O$_7$ | 1855 | 78.7 |
| 2 | Al$_2$O$_3$ | 1700 | 86.2 |
| 3 | BaSO$_4$ | 1935 | 86.6 |
| 4 | LaPO$_4$ | 1880 | 82.3 |

The present invention has made it possible to present a fluorescent lamp which is capable of controlling the optical output without reducing the luminous flux-maintaining ratio of the fluorescent lamp by adopting the above construction.

I claim:

1. A fluorescent lamp made by a process comprising the steps of:
    firing particles of a non-fluorescent substance at a temperature of at least 1000° C.; and
    coating, a layer comprising said non fluorescent substance and a layer comprising a phosphor, or a mixture of said non-fluorescent substance and a phosphor, on an inner wall of a glass bulb;
    wherein said non-fluorescent substance is an oxide containing at least one rare earth element selected from the group consisting of yttrium, gadolinium and lanthanum.

2. The fluorescent lamp according to claim 1, wherein the temperature for firing is within a range of from 1100° C. to 1600° C.

3. The fluorescent lamp according to claim 1, wherein the non-fluorescent substance contains at least one element selected from the group consisting of an alkaline earth metal and boron.

4. The fluorescent lamp according to claim 3, wherein the content of said at least one element is at most 5,000 ppm.

5. The fluorescent lamp according to claim 3, wherein the content of said at least one element is from 10–3,000 ppm.

6. The fluorescent lamp according to claim 3, wherein the alkaline earth metal is at least one element selected from the group consisting of Ba, Sr, Ca and Mg.

7. The fluorescent lamp according to claim 3, wherein said non-fluorescent substance contains boron and Ba.

8. The fluorescent lamp according to claim 1, wherein the non-fluorescent substance has a particle size in the range of from 0.5–10 μm.

9. The fluorescent lamp according to claim 8, wherein the non-fluorescent substance has an average particle size smaller by from 1–3 μm than the average particle size of said phosphor.

10. The fluorescent lamp according to claim 1, wherein the non-fluorescent substance has an average particle size smaller than the average particle size of said phosphor.

11. The fluorescent lamp according to claim 1, wherein said inner wall of said glass bulb is coated with said mixture of said non-fluorescent substance and said phosphor.

12. The fluorescent lamp according to claim 1, wherein said inner wall of said glass bulb is coated with a layer comprising said non-fluorescent substance and a comprising said phosphor layer.

13. The fluorescent lamp according to claim 1, wherein said non-fluorescent substance comprises particles consisting of said oxide.

\* \* \* \* \*